June 28, 1966   D. G. THOMAS   3,257,969
RAILWAY CAR CENTER PLATE
Filed April 30, 1962
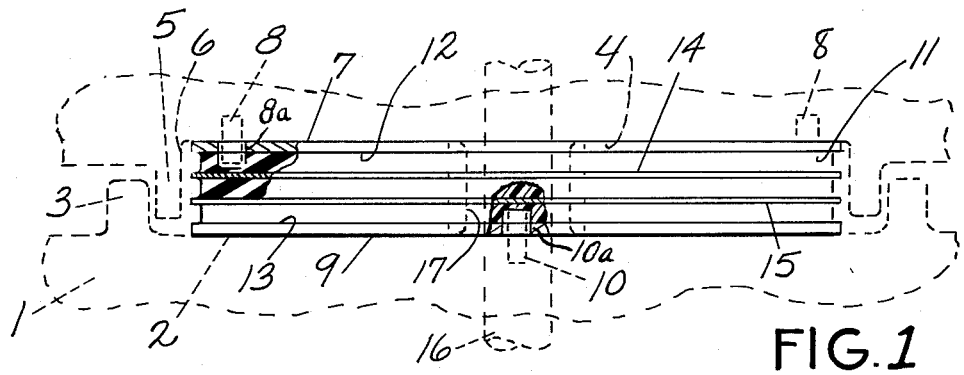
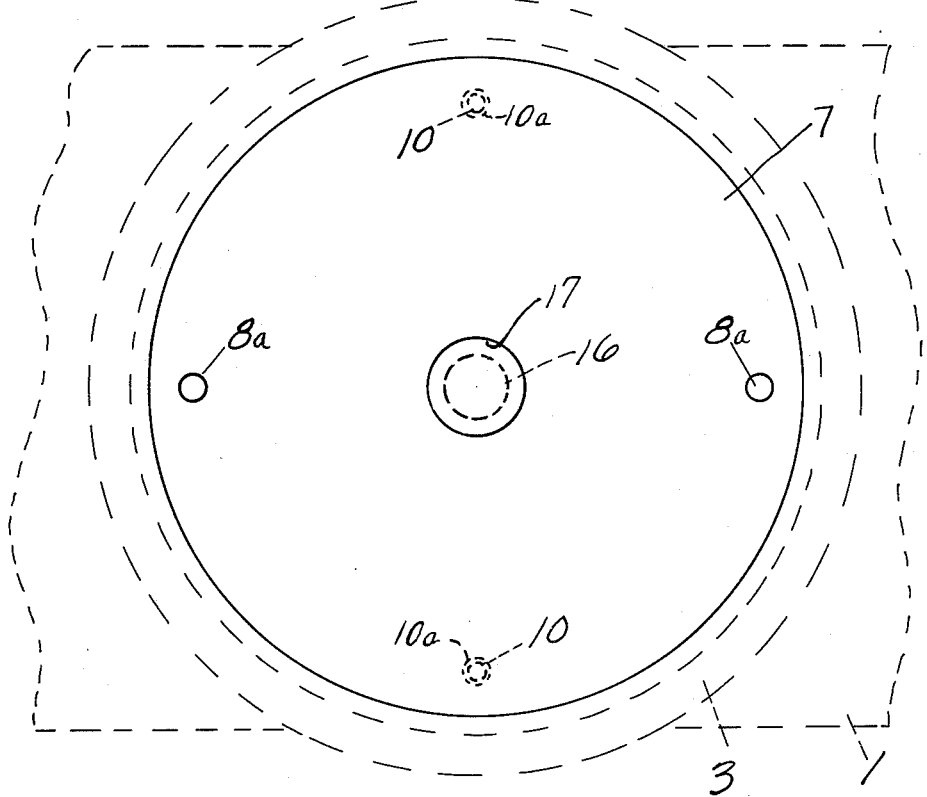
INVENTOR.
David G. Thomas
BY Ralph Hammar
Attorney

United States Patent Office 3,257,969
Patented June 28, 1966

3,257,969
RAILWAY CAR CENTER PLATE
David G. Thomas, Erie, Pa., assignor to Lord Corporation, a corporation of Pennsylvania
Filed Apr. 30, 1962, Ser. No. 191,044
2 Claims. (Cl. 105—199)

This invention is intended to reduce friction by supporting the car center plate on the truck center plate through an annular elastomeric sandwich between and anchored to the center plates and sustaining the operating forces without disturbing the alignment between the car and truck. See ASME Paper 61-WA-239 for the friction problems of railway center plates.

In the drawing, FIG. 1 is a fragmentary view partly in section of the car and truck center plates in operative relation and FIG. 2 is a top plan view of the truck center plate with the annular sandwich mounted thereon.

In the drawing, 1 indicates the truck bolster having a center plate with an upwardly presented horizontal load carrying surface 2 surrounded by an integral upstanding annular flange 3. The car frame has a center plate with a horizontal downwardly presented load carrying surface 4 surrounded by a flange 5 telescoped within the flange 3. A cylindrical recess 6 is machined in the car center plate within the flange 5 to accommodate an annular sandwich consisting of a top plate 7 suitably anchored to the car center plate for example by diametrically opposed pins 8 fixed to the car center plate fitting in sockets 8a in the top plate 7 and a bottom plate 9 anchored to the truck center plate by similar pins 10 fixed to the truck center plate and fitting in sockets 10a in the bottom plate 9. Sandwiched between the plates 7 and 9 is a body 11 of suitable elastomer bonded to the opposed faces 12 and 13 of the plates 7 and 9 and to opposite faces of annular plates 14, 15 embedded in the elastomer. The plates 7, 9, 14 and 15 are parallel to each other and to the opposed load carrying surfaces 2 and 4 of the car and truck center plates. The customary center pin diagrammatically indicated at 16 extends through an opening 17 at the center of the elastomeric body 11.

As the truck enters a curve, there is relative angular movement between the car and truck center plates which is accommodated by torsional shear of the elastomeric body 11. This takes place because the plates 7 and 9 are non rotatably anchored to the car and truck center plates. In order to accommodate the relative angular movement, a substantial thickness of elastomer is necessary. In a practical design for a 70 ton car, the thickness was substantially 1½ inches and the diameter was substantially 12 inches. At a relative angular movement between the car and truck center plates of 10°, substantially the maximum encountered in service, the torque was 1666 foot pounds which is lower than the friction torque for a comparably loaded car under the most favorable conditions of lubrication and far lower than that encountered with lubricated center plates under normal conditions. Lower torque between the center plates has the advantage of reducing the pressure between the wheel flanges and the track. The further advantage of the elastomeric center plate is that upon leaving a curve and returning to the straight-of-way, the center plates tend to return to the cener position by reason of the forces stored in the elastomer and not solely because of the pressure on the wheel flanges.

The plates 14 and 15 have the important effect of increasing the vertical or compression stiffness without affecting the shear stiffness of the elastomer necessary to accommodate the angular movement between the center plates. The increase in the compression stiffness of the elastomer is important for two reasons. First, the compressive stiffness of the elastomer minimizes the vertical deflection under load and prevents lateral tilting of the car center plate relative to the truck center plate and thereby maintains the required clearance between the car frame and the truck bolster. A second effect is in raising the vertical natural frequency of the car above the range of 2 to 7 cycles per second in which track excited frequencies occur. By having the natural frequency of the car on the truck above this range, the elastomer behaves as though it were a rigid connection between the center plates for all of the track excited forces. If the plates 14 and 15 were omitted, the construction would not be useful for practical purposes. The elastomer would be too soft in compression to hold the required clearance between the side frame of the car and the truck bolsters. Also, the natural frequency in a vertical direction would fall into resonance with the track excited frequencies in the range of 2 to 7 cycles per second.

What is claimed as new is:

1. In a railway car, a truck center plate having an upstanding annular shoulder surrounding an upwardly presented horizontal load carrying surface, a car center plate having a depending annular shoulder surrounding a downwardly presented horizontal load carrying surface, said shoulders being in telescoping relation, an annular sandwich forming the load carrying connection between the car and truck center plates, said sandwich having an annular top plate, means for non rotatably anchoring the top plate to said downwardly presented surface, an annular bottom plate, means for non rotatably anchoring the bottom plate to said upwardly presented surface, an annular body of elastomer sandwiched between and bonded to the top and bottom plates, the top and bottom plates and the elastomer being designed so the car weight applied to the elastomer loads the elastomer substantially solely in compression and relative angular movement of the top and bottom plates loads the elastomer in torsional shear, and means for preventing bulging of the elastomer under vertical load and thereby increasing the stiffness in a vertical direction and minimizing vertical deflection without affecting the shear stiffness of the elastomer necessary to accommodate relative angular movement between the center plates and raising the natural frequency of the car in the vertical direction above the range of the track excited frequencies of two to seven cycles per second.

2. In a railway car, a truck center plate having an upstanding annular shoulder surrounding an upwardly presented horizontal load carrying surface, a car center plate having a depending annular shoulder surrounding a downwardly presented horizontal load carrying surface, said shoulder being in telescoping relation, an annular sandwich forming the load carrying connection between the car and truck center plates, said sandwich having an annular top plate, means for non rotatably anchoring the top plate to said downwardly presented surface, an annular bottom plate, means for non rotatably anchoring the bottom plate to said upwardly presented surface, an annular body of elastomer sandwiched between and bonded to the top and bottom plates, the top and bottom plates and the elastomer being designed so the car weight applied to the elastomer loads the elastomer substantially solely in compression and relative angular movement of the top and bottom plates loads the elastomer in torsional shear, and horizontal annular plates embedded in and bonded to the elastomer for preventing bulging of the elastomer under vertical load and thereby increasing the stiffness in a vertical direction and minimizing vertical deflection without affecting the shear stiffness of the elastomer necessary to accommodate relative angular movement between the center plates and raising the natural frequency of the car in the vertical direction above the range of the track excited frequencies of two to seven cycles per second.

References Cited by the Examiner

UNITED STATES PATENTS

| | | | |
|---|---|---|---|
| 2,158,028 | 5/1939 | Burke | 267—63 |
| 2,258,640 | 10/1941 | Beckette | 105—199 |
| 2,509,955 | 5/1050 | Barnes | 105—199 |
| 2,514,034 | 7/1950 | Dean | 105—199 |
| 3,045,998 | 7/1962 | Hirst | 105—199 X |
| 3,083,065 | 3/1963 | Hinks et al. | 267—57.1 |

ARTHUR L. LA POINT, *Primary Examiner.*

LEO QUACKENBUSH, MILTON BUCHLER,
*Examiners.*

H. BELTRAN, *Assistant Examiner.*